United States Patent [19]

Nakada et al.

[11] 3,933,307
[45] Jan. 20, 1976

[54] AUTOMATIC CHOKE VALVE CONTROL ARRANGEMENT FOR AN INTERNAL COMBUSTION ENGINE

[75] Inventors: Masahiko Nakada; Nobuyuki Kobayashi, both of Toyota, Japan

[73] Assignee: Toyota Jidosha Kogyo Kabushiki Kaisha, Japan

[22] Filed: June 6, 1974

[21] Appl. No.: 476,942

[30] Foreign Application Priority Data
June 6, 1973 Japan.................. 48-62879

[52] U.S. Cl........................ 237/12.3 B; 123/119 F
[51] Int. Cl.².......................................... B60H 1/02
[58] Field of Search ............... 123/119 F–119 X; 237/12.3 B, 12.3

[56] References Cited
UNITED STATES PATENTS
3,818,881    6/1974    Hosho et al. ................. 123/119 F Primary Examiner—William E. Wayner
Attorney, Agent, or Firm—Toren, McGeady and Stanger

[57] ABSTRACT

An improved choke valve control arrangement whose regulating thermostat is heated by a separate electric heater is described. The thermostat heater is coupled to the vehicle power supply through one of a first plurality of switch controlled paths of difference impedance. Each path corresponds to a different rate of opening of the choke valve as a function of engine temperature. A separate room heater arranged to absorb heat from the engine cooling water is coupled to the power supply through a second plurality of switch controlled paths. A ganging arrangement for the switches associates corresponding pairs of paths of the thermostat and room heaters so that a change in the excitation of the room heater is accompanied by a proportional change in the rate of heating of the thermostat heater.

2 Claims, 4 Drawing Figures

AUTOMATIC CHOKE VALVE CONTROL ARRANGEMENT FOR AN INTERNAL COMBUSTION ENGINE

BACKGROUND OF THE INVENTION

The invention relates to a choke valve control arrangement for an internal combustion engine, and more particularly to an automatic choke valve control arrangement regulated by a thermostat that is heated by an electrical heater.

At the instant of starting a cold engine, atomization of the fuel is usually insufficient and ignition is therefore difficult. To correct this, it is necessary to supply a relatively large quantity of fuel to the cold engine by reducing the effective area of the valve at the inlet of the carburetor. As the engine warms up, the choke valve is moved progressively to its fully opened position to yield an optimum air-fuel ratio.

It has long been known in this art to operate the choke valve automatically by means of a thermostat responsive to the temperature of the engine cooling water or of the engine exhaust gases. In general, arrangements for heating the thermostat with coolant engine are complicated, while arrangements for heating the thermostat with air warmed by the exhaust gases are susceptible to improper operation of the choke valve in the presence of foreign materials which are often introduced into the heating air.

More recently, simpler choke valve control arrangements have been developed wherein the thermostat is heated by an electric heater. Unfortunately, the response of presently known designs of this type to changes in the engine water temperature is slow; this is particularly true in the case where the vehicle is equipped with a separate room heater which, when made operative, absorbs heat from the engine cooling water to warm the passenger compartment. Because the room heater and the thermostat heater operate independently in such designs, the heat absorbed by the room heater when the latter is operative is not taken into account in the operation of the thermostat heater so that the latter functions as if the engine were colder than it actually is. Accordingly, the choke valve dictates an unduly rich air-fuel mixture to the engine before actual engine conditions require it. As a result, operating conditions for the engine will not be optimum, and the latter will tend to exhibit incomplete combustion with the accompanying danger of producing poisonous exhaust gases.

SUMMARY OF THE INVENTION

The present invention provides an improved automatic choke valve control arrangement of the type employing an electric heater, for avoiding the disadvantages of the prior art.

An illustrative embodiment of the invention is described for the case where the vehicle room heater and the thermostat heater are separately connected to the vehicle power source, e.g., a battery operating through the ignition switch. Such connections are provided by separate first and second switches. The first switch has a first inoperative position wherein the room heater is disconnected from the power source, and a second operative position wherein the heater is energized to be responsive to changes in the engine water temperature in the normal manner. The second switch, in turn, couples the power source to the thermostat heater either through a low impedance first path or through a high impedance second path. The establishment of the first path through such second switch permits the thermostat heater to effect the normal, relatively rapid movement of the choke valve into its open position, while the establishment of the second position of such switch serves to retard the thermostat action and thereby lengthen the time required for the choke valve to reach its fully opened position.

Separate ganging means associate the first and second switches in such a manner that when the first switch is in its inoperative position to maintain the room heater disabled, the second switch establishes the first path to the thermostat heater to permit normal operation thereof. On the other hand, when the first switch is placed in its operative position whereby the room heater is permitted to absorb heat from the engine and thereby lower the temperature of the cooling water, the second switch correspondingly establishes the second path to the thermostat heater to retard the operation of the choke valve and to thereby accommodate the longer warm-up of the engine. If desired, each of the first and second switches may be provided with three or more positions, each with a difference impedance. In such a case a ganging means associates corresponding pairs of the respective switch positions so that the impedance exhibited in the room heater excitation path is accompanied by a corresponding impedance in the thermostat heater excitation path.

BRIEF DESCRIPTION OF THE DRAWING

The invention is further set forth in the following detailed description taken in conjunction with the appended drawing, in which.

DETAILED DESCRIPTION

Figure 1:
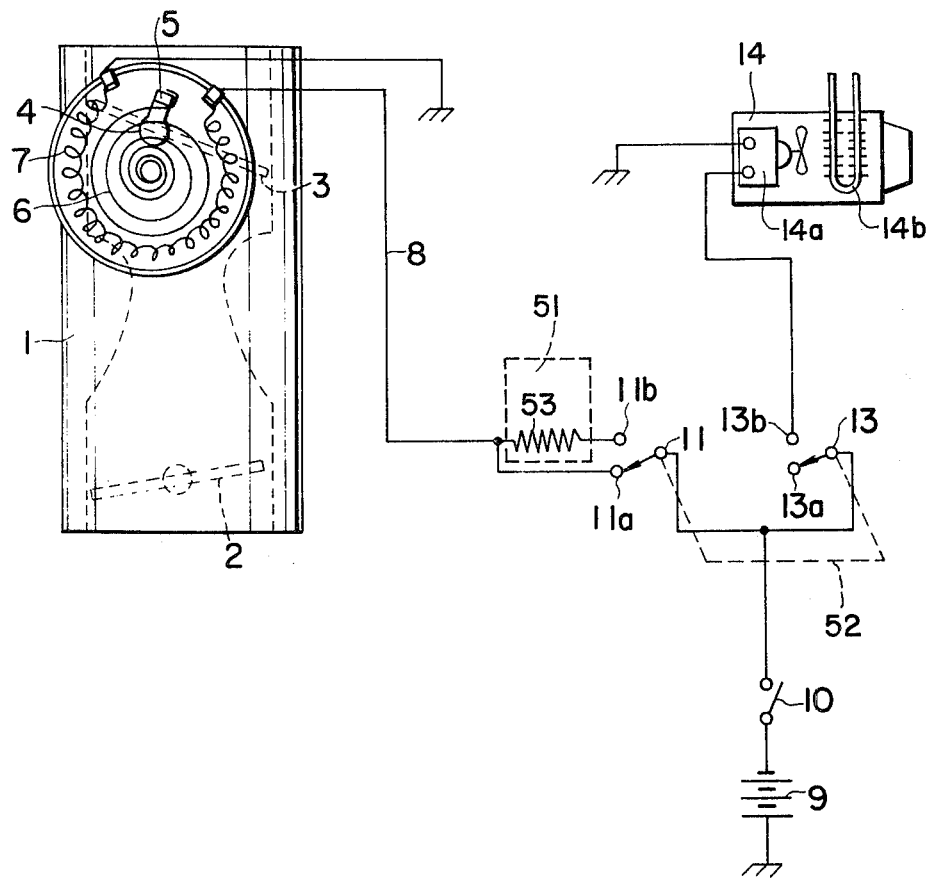
FIG. 1 is a combined pictorial and schematic diagram of an automatic choke valve control arrangement in accordance with the invention.

Referring now to the drawing, a carburetor 1 is associated with a throttle valve 2 and an overlying choke valve 3. The movement of the choke valve is controllable by means of a lever 5 attached to a valve shaft 4. An outer end of a conventional coil thermostat 6 is affixed to the lever 5 for conventionally positioning the choke valve between a closed and an open position, while the inner end of the thermostat is affixed to the body of the carburetor 1.

An electric heater 7 is shown in surrounding relation to the thermostat 6 whereby the progressive heating of the thermostat by the heater 7 when the latter is excited as described below, causes the choke valve 3 to progressively open as the temperature of the engine cooling water rises. (A type course of temperature of the engine cooling water during such warm-up is shown as curve A of FIG. 3, while the corresponding rate of opening of the choke valve 3 under the influence of the heater 7 and the thermostat 6 is shown at curve A in FIG. 4.)

Electrical excitation of the heater 7 is normally supplied from a vehicle power source 9, represented by a battery, via an engine ignition switch 10 and a first contact 11a of a switch 11. In this normal position, a low impedance path, represented by a short circuit, is established from the battery through the switch 11 to rapidly heat the electric heater 7. As a result the opening of the choke valve 3 takes place in the relatively short length of time depicted in the above-mentioned curve a of FIG. 4.

Such normal mode of operation of the heater 7 and the choke valve 3 has been found inappropriate where the vehicle is further equipped with a room heater represented at 14. Such room heater is conventionally mounted in the passenger compartment (not shown) of the vehicle and is normally composed of a fan 14a driven by an electric motor and a heat exchanger 14b heated by engine cooling water. Such a fan motor also normally excitable from the battery 9 through the ignition switch 10 and a separate switch 13 when the latter is moved from an inoperative position 13a to an operative position 13b.

Figure 3:
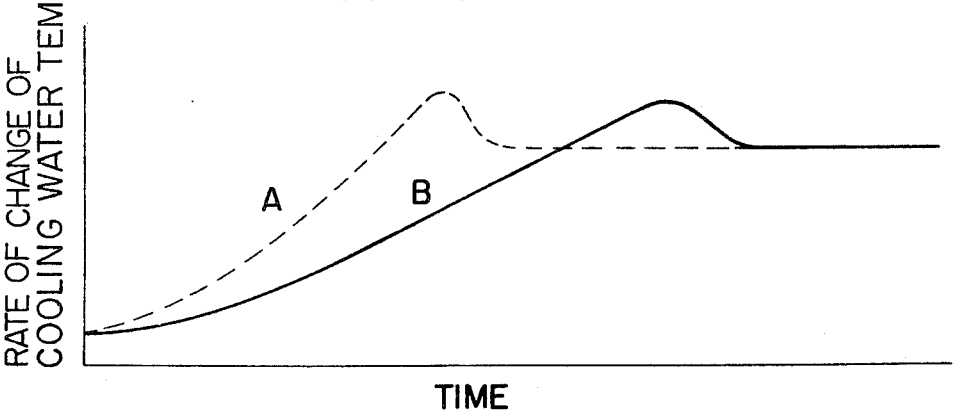
FIG. 3 is a set of curves showing the rate of change of engine cooling water temperature in a vehicle equipped with a room heater that is placed in its inoperative and operative positions respectively.

Such types of room heaters absorb heat from the engine cooling water thereby delaying the engine warm-up as indicated at curve B of FIG. 3. Under these circumstances, the choke valve 3 is normally operated to its open position before the engine has fully warmed up. As a result the engine will be fed an inappropriately lean air-fuel mixture so that the engine will not operate smoothly and will be susceptible to incomplete combustion.

In accordance with the invention, such problems are avoided by providing (1) at least one separate relatively high resistance path 51 in the energy supply line of the heater 7 via the switch 11, and (2) a switch ganging arrangement represented at 52 for associated the switches 11 and 13. The effect of switching in the high impedance path 51, e.g., by moving the switch 11 to an associated contact 11b in series with a resistor 53, is to slow up the heating of the electric heater 7 and thereby retard the thermostat 6 so that the movement of the choke valve 3 to its open position will be delayed relative to such movement when the switch 11 establishes its low impedance position via contact 11a. Such delayed characteristic of the choke valve opening movement is shown as curve b in FIG. 4 and corresponds to the retarded warm-up characteristic B shown in FIG. 3.

To accomplish this result, the ganging arrangement 51 operates in such a manner that the switch 11 establishes its high impedance path through contact 11b whenever the switch 13 establishes a room heater excitation path through the operative contact 13b. Conversely, when the switch 13 is placed in its inoperative position via contact 13a, i.e., when the room heater is not on so that the warm-up of the engine cooling water proceeds unaffected, the switch 11 is placed in its low impedance position via contact 11a whereby the thermostat 6 operates in a normal manner. Consequently, the curve a of FIG. 4 will occur simultaneously with the curve A of FIG. 3.

Figure 2:
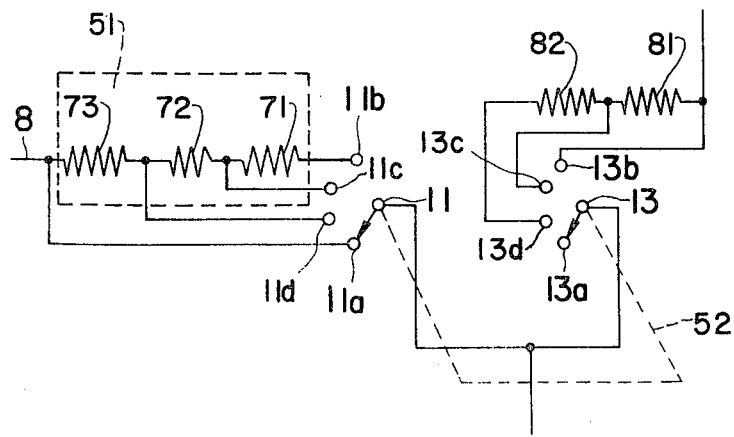
FIG. 2 is a schematic diagram of an alternative embodiment of the switching apparatus used in the arrangement of FIG. 1.

FIG. 2 shows an alternative arrangement of the excitation paths for the switches 11 and 13 and for the associated thermostat heater 7 and room heater 14 respectively. In this arrangement the switches 11 and 13 each have four positions with the corresponding positions 11a and 13a having the same significance as discussed above in connection with FIG. 1. The three upper positions 11b 11c, and 11d of the switch 11 each defines a different impedance path to the control line 8 of the heater 7, as established by one or more of a plurality of resistors 71, 72, and 73, respectively.

Figure 4:
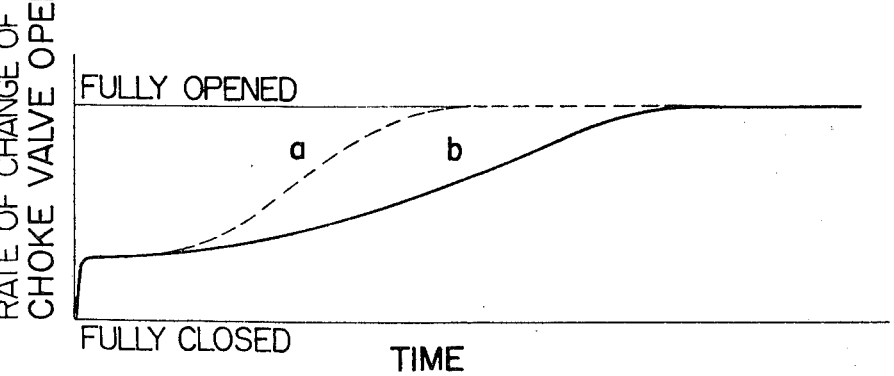
FIG. 4 is a set of curves showing the rate of change of opening of the choke valve for the respective conditions depicted in FIG. 3.

The path defined through the contact 11b of the switch 11 has the highest resistance, corresponding to the longest delay of the opening of the choke valve 3, while the paths through the contacts 11c and 11d of such switch have progressively lowered impedances. The excitation of the heater 14 corresponding to that resulting from the establishment of one of the paths through the contacts 11b, 11c and 11d of the switch 11 are respectively provided through contacts 13b, 13c, and 13d of the switch 13. In particularly, the operative paths established through the contacts 13b, 13c, and 13d, exhibit progressively higher impedances as determined by one or both of resistors 81 and 82. Consequently, matched characteristics corresponding to those of FIGS. 3 and 4 are accomplished by associated switches 11 and 13, via the ganging arrangement 52, such that an appropriate pair of the paths 11a and 13a, 11b and 13b, 11c and 13c, and 11d and 13d are simultaneously established.

In the foregoing, the invention has been described in connection with preferred arrangements thereof. Many variations and modifications will now occur to those skilled in the art. It is accordingly desired that the scope of the appended claims not be limited to the specific disclosure herein contained.

What is claimed is:

1. For use in a water-cooled motor vehicle equipped with (A) a room heater excitable by a power source in accordance with the temperature of the vehicle engine cooling water and (B) a separate electric heater excitable by the power source for controlling a thermostat that automatically adjusts the vehicle engine choke valve, an improved automatic choke control arrangement which comprises:

first switching means for selectively connecting the power source to the room heater to effect operation of the room heater when the first switching means is moved from a first inoperative position to a second operative postion;

second switching means for connecting the power source to the thermostat heater through a selected one of a first path and a second path, the impedance of the second path being high relative to that of the first path, whereby the choke valve is opened at a relatively high rate when the second switching means establishes the first path and at a relatively low rate when the second switching means establishes the second path; and ganging means coupling the first and second switching means for establishing the first path of the second switching means when the first switching means is in its inoperative position and for establishing the second path of the second switching means when the second switching means is in its operative position.

2. An automatic choke valve control arrangement as defined in claim 1, in which the first switching means includes a plurality of second positions each associated with a different impedance, the second switching means includes a plurality of second paths of mutually different impedances, and a ganging means comprises means for associated each second position of the first switching means with a corresponding second pass of the second switching means.

* * * * *